(12) United States Patent
Zhang

(10) Patent No.: US 7,685,118 B2
(45) Date of Patent: Mar. 23, 2010

(54) METHOD USING ONTOLOGY AND USER QUERY PROCESSING TO SOLVE INVENTOR PROBLEMS AND USER PROBLEMS

(75) Inventor: Guoming Zhang, Beijing (CN)

(73) Assignee: Iwint International Holdings Inc., Tortola (VG)

(*) Notice: Subject to any disclaimer, the term of this patent is extended or adjusted under 35 U.S.C. 154(b) by 403 days.

(21) Appl. No.: 10/916,617

(22) Filed: Aug. 12, 2004

(65) Prior Publication Data
US 2006/0047632 A1 Mar. 2, 2006

(51) Int. Cl.
*G06F 17/30* (2006.01)

(52) U.S. Cl. .................. 707/5; 707/3; 707/7; 706/45

(58) Field of Classification Search .................. 707/5
See application file for complete search history.

(56) References Cited

U.S. PATENT DOCUMENTS

| | | | |
|---|---|---|---|
| 5,581,663 A * | 12/1996 | Zlotin et al. ................. 706/46 |
| 5,822,731 A | 10/1998 | Schultz | |
| 5,940,821 A * | 8/1999 | Wical ........................... 707/3 |
| 6,161,084 A * | 12/2000 | Messerly et al. ............... 704/9 |
| 6,167,370 A * | 12/2000 | Tsourikov et al. ............. 704/9 |
| 6,363,378 B1 | 3/2002 | Conklin et al. | |
| 6,460,034 B1 | 10/2002 | Wical | |
| 6,480,843 B2 | 11/2002 | Li | |
| 6,498,795 B1 | 12/2002 | Zhang et al. | |
| 6,523,026 B1 * | 2/2003 | Gillis ............................ 707/3 |
| 6,675,159 B1 | 1/2004 | Lin et al. | |
| 6,694,331 B2 * | 2/2004 | Lee ......................... 707/104.1 |
| 7,392,238 B1 * | 6/2008 | Zhou et al. ...................... 707/3 |
| 7,536,368 B2 * | 5/2009 | Todhunter ..................... 706/45 |
| 7,548,910 B1 * | 6/2009 | Chu et al. ....................... 707/4 |
| 2001/0003183 A1 * | 6/2001 | Thompson et al. ............. 707/3 |
| 2002/0107844 A1 | 8/2002 | Cha et al. | |
| 2002/0116169 A1 | 8/2002 | Ait-Mokhtar et al. | |
| 2002/0147578 A1 | 10/2002 | O'Neil et al. | |
| 2003/0177112 A1 | 9/2003 | Gardner | |
| 2004/0083092 A1 * | 4/2004 | Valles ............................ 704/9 |

FOREIGN PATENT DOCUMENTS

JP 2000222436 11/2000
WO WO 03/030025 A1 4/2003

* cited by examiner

*Primary Examiner*—Neveen Abel Jalil
*Assistant Examiner*—Christyann R Pulliam
(74) *Attorney, Agent, or Firm*—Venable LLP; Ralph P. Albrecht; Christopher Ma

(57) ABSTRACT

A system, method and computer program product for solving a problem based on ontology methods for data/knowledge presentation and processing, may be implemented in a linguistic processing module. The basic components of the linguistic processing module may be a linguistic knowledge base (KB), an ontology KB, and/or an expert KB. The problem solved may include a user or an inventor problem. The method may include storing a user query which may include a structured, or a non-structured description, parsing a non-structured query to create a structured query including a formal semantic representation of the query, semantically expanding the formal semantic representation, searching the expert KB using the formal semantic representations to local solutions for the problem, and semantically sorting the solutions to produce a list of solutions of the problem.

31 Claims, 3 Drawing Sheets

METHOD USING ONTOLOGY AND USER QUERY PROCESSING TO SOLVE INVENTOR PROBLEMS AND USER PROBLEMS

BACKGROUND OF THE INVENTION

1. Field of the Invention

The present invention relates to solution automation of inventor and user problems, and more particularly, to using semantic methods of information and knowledge representation and processing for solving such problems.

2. Related Art

Solving inventor problems and technical problems of a user may require, first of all, good information support, i.e. operative access to information or knowledge. Good information support can answer how to solve the problem or can facilitate providing information related to the solution of the problem (for example, information in another knowledge domain, in the same knowledge domain but in other type of system, etc.) that is able to point to the inventor or user the needed direction for the solution search. Conventionally, computer based information retrieval may be performed by means of a search engine.

In unsophisticated information retrieval systems, a search may be performed by searching for the presence of key words (inputted by the user) in documents contained in a database. This kind of search may be characterized by low precision and recall. Modern information retrieval systems should provide the user the possibility of formulating a query in natural language, i.e. the systems should have a natural language user interface. Then, the automatic linguistic analysis of the query is performed and its formal representation created. The linguistic analysis can be performed at different levels of depth of natural language. This analysis, in an ideal case, should include the semantic level. It is important to recognize not only relations between different elements of the query (usually, the most informative elements), but as well the relations between query elements and the corresponding components from an outer world model or a certain knowledge domain. Thus, it became desirable to use semantic relations between concepts, described in models of knowledge representation such as a thesaurus or ontology, to improve information retrieval system performance in different manners in various applications.

Ontology is a hierarchical lexical structure where concepts expressed by words or word-combinations are defined and are linked with semantic relations. Ontologies can be domain-specific or general depending on the terms they describe and attempt to reflect a human's knowledge about the specific domain or the surrounding world. Since ontology represents a valuable and extensive set of data, ontology can be successfully used in information retrieval to improve the precision and the recall of search results.

Some information retrieval systems like the system described in U.S. Pat. No. 6,675,159 B1 ("the '159 patent"), the contents of which is incorporated herein by reference in its entirety, use ontologies to index collections of documents with ontology-based predicate structures. The system of the '159 patent extracts the concepts behind user queries to return only the documents that match these concepts. The system has the capabilities of an ontology-based search system and it can search for logically structured groupings of items from the ontology. For example, from an exemplary query "What is the current situation of the stock market?" an attribute extractor extracts direct attributes "current", "situation", "stock", and "market" from the query. The attribute extractor can also, e.g., expand attribute "stock" to "finance", "banks", "brokerages", "Wall Street", etc. by using an ontology that contains hierarchically-arranged concepts.

The information presented in a knowledge base search and retrieval system, described in U.S. Pat. No. 5,940,821, ("the '821 patent") and the related document knowledge base research and retrieval system, described in U.S. Pat. No. 6,460,034 B1, ("the '034 patent") (the contents of both of which are incorporated herein by reference in their entireties) use a knowledge base (that stores associations among terminology/categories that have a lexical, semantic or usage association.) for document theme vectors identification (by inferring topics from terminology of a document), document classification in categories and are also able to retrieve a relevant document in response to a query by expanding query terms and the theme with the help of the knowledge base. The '034 system includes factual knowledge base queries as well as concept knowledge base queries. The factual knowledge base queries identify, in response to a query, the relevant themes, and the documents classified for those themes. In contrast, the concept knowledge base queries do not identify specific documents in response to a query, but identify the potential existence of a document by displaying associated categories and themes.

The content processing system of the '821 and '034 patents include a linguistic engine, a knowledge catalog processor, a theme vector processor, and a morphology section. The linguistic engine, which includes a grammar parser and a theme parser, processes the document set by analyzing the grammatical or contextual aspects of each document, as well as analyzing the stylistic and thematic attributes of each document. Specifically, the linguistic engine generates, as part of the structured output, contextual tags, thematic tags, and stylistic tags that characterize each document.

The knowledge base of the '821 and '034 patents is used to generate an expanded set of query terms, and the expanded query term set is used to select additional documents. To expand a query term using the knowledge base, the levels or tiers of the classification hierarchy as well as the knowledge base associations are used to select nodes within predefined criteria. In one embodiment, the query term strength is decreased based on the distance weight (e.g. query term weights are decreased by 50% for each point of semantic distance when expanding either to a more general category, (e.g. a parent category) or to an association), and all nodes with a resultant query term weight greater than one are selected. All child categories and terms beneath a node are selected.

However, the system of the '821 and '034 patents is oriented mainly to theme vector identification. The '034 system requires the documents from the retrieved database to be indexed with special contextual, thematic and stylistic tags and the query terms expansion based on ontology is used to retrieve additional documents taking into consideration its theme vector.

Ontology also is conventionally applied in database management systems. In International patent application publication No. WO-2003/030025A1 ("the '025 publication"), the contents of which is incorporated herein by reference in its entirety, the database management system uses ontology to solve the problems of semantic heterogeneity, and semantic mismatch and query integration against distributed resources. The proposed solution to the problems of semantic heterogeneity is to formally specify the meaning of the terminology of each system using ontologies (shared and personal ones). Thus, the system of the '025 publication provides a distributed query solution for a network having a plurality of database resources. The network helps users to make queries which retrieve and join data from more than one resource, which may be of more than one type such as an SQL or XML database.

Consequently, ontology is used in the system of the '025 publication to disambiguate terminology vagueness while retrieving information from different heterogeneous information resources.

In U.S. patent application Publication No. 2002/0107844 A1 ("the '844 publication"), the contents of which is incorporated herein by reference in its entirety, ontology is referred to be used in an information generation and retrieval system as an instrument that helps to build semantic representation of the sentence in the form of a conceptual graph. During the information request procedure, a natural language query of a user is transformed to the conceptual graph by analyzing sentence structure and semantic structure and then a conceptual graph in a database, which is nearest to the conceptual graph of the query with respect to sense is searched and semantic appropriateness is computed to display information indexed by the searched conceptual graph to the user.

Thus, the application of ontology in information retrieval implies conceptual graph building as well as the query and database conceptual graph comparison.

The method and apparatus for active information discovery and retrieval, described in U.S. Pat. No. 6,498,795 B1, ("the '795 patent"), the contents of which is incorporated herein by reference in its entirety, use an active network framework and an ontology-based information hierarchy for semantic structuring and automated information binding, and provide a symmetrical framework for information filtering and binding in the network. Queries from information requesters are directly routed to relevant information sources and contents from information providers are distributed to the destinations that expressed an interest in the information.

The method of the '795 patent implies creating content ontology instance trees and query ontology instance trees on each of the active network nodes. Active networks architecture and an ontology-based information hierarchy are used as the network and the semantic frameworks respectively. The system uses simple hypertext markup language (HTML) ontology extensions (SHOE). When a SHOE instance makes specific claims based upon a particular ontology, a software agent can draw on that particular ontology to infer knowledge that is not directly stated. The ontology provides context as implicit knowledge. SHOE tags allow defining new ontologies based on existing ones. The search operational model is applied on any part of sub-hierarchy of the ontology instance tree. Special coefficients are calculated to determine the probability of the child nodes of ontology to be accessed with the parent node of ontology.

Hence, ontology in the '795 patent is used for semantic structuring of the retrieved information, which implies previous annotation with ontological tags (using SHOE, both automatically or manually) of the information resources, and only then it is possible to retrieve information based on the ontology relations represented by SHOE tags.

In U.S. patent application Publication No. 2002/0116169 A1("the '169 publication"), the contents of which is incorporated herein by reference in its entirety, a method and apparatus for generating normalized representations of strings is described. Ontologies, thesauri, and terminological databases are used therein as means for normalization of semantic representation of the string.

The described method of the '169 publication attempts to increase the retrieval performance of information retrieval systems by suggesting use of ontology to semantically normalize query and database strings.

An ontology-based information management system and method, described in U.S. patent application Publication No. 2003/0177112, ("the '112 publication"), the contents of which is incorporated herein by reference in its entirety, uses ontology to provide semantic mapping between entries in a structured data source, and concepts in an unstructured data source and includes processes for creating, validating, augmenting, and combining ontologies for life sciences, informatics and other disciplines. The system of the '112 publication proposes to use an ontology to enable effective syntactic and semantic mapping between mapping entities discovered using concept-based text searching, and those derived from data warehousing and mining in a plurality of disciplines.

The system of the '112 publication may evaluate the distance between a pair of terms in a given information space using an information retrieval engine capable of categorizing large document sets.

Nevertheless, the proposed method of the '112 publication is mainly oriented to managing information sources based on ontologies, which help to integrate structured and unstructured data. The information sources are the source of creating new ontologies combining them, etc. The information retrieval engine is based on the categorization of the data.

Ontology is also used for query expansion. In U.S. Pat. No. 5,822,731 ("the '731 patent"), the contents of which is incorporated herein by reference in its entirety, a semantic network is applied to maximize the number of relevant documents identified during a query search by semantically expanding the search in response to the part of speech associated with each query term in the search.

In U.S. patent application Publication No. 2001/0003183 A1, ("the '183 publication"), the contents of which is incorporated herein by reference in its entirety, a method and apparatus for knowledgebase searching is described. Ontologies are an integral part of this system. A library of query templates and a dictionary that relates keywords to more abstract concepts are first prepared on a computer system. Each template contains one or more typed variables. A query is then generated by entering into the system one or more keywords. Each keyword is abstracted to concept (using different thesauri and ontologies). Each concept may be further refined by additional abstraction, or by picking one concept from several candidates, or by successive abstraction and rejection of different keywords until an acceptable concept is found. Next, for the concepts that are obtained, the system finds all query templates are then instantiated with those concepts or with the keywords used to form the concepts. The user then selects the most appropriate query from among the instantiated query templates. The system of the '183 publication may be applied in formulating queries to access any set of information sources. The '183 publication system is particularly useful to access distributed, heterogeneous databases which do not have a single standardized vocabulary or structure.

In fact, the latter three above-mentioned methods represent key word search expansion by means of ontology with different variations.

The method and device for supporting information retrieval by using ontology, and storage medium recording information retrieval support program, described in JP-2000222436, ("the '436 publication"), the contents of which is incorporated herein by reference in its entirety, is designed to provide an information retrieval supporting method. The method is capable of dynamically preparing a database selection menu for selection of a database suited for retrieving information required by a user. The solution suggested by the author of the '436 publication is ontology describing the concept system of information managed by a database as tree structure of information concepts from a higher degree of abstraction to a lower degree of abstraction and a database selection menu for specifying the concept of information required to be retrieved by a user is dynamically generated by presenting concepts registered in the ontology stepwise from the higher degree of abstraction to the lower degree of abstraction.

Briefly, the method of the '436 publication suggests using ontology, reflecting database content, to help a user to specify the concept that is searched by refinement or generalization of the concept.

The method and system for query reformulation for searching of information is described in U.S. patent application Publication No. 20020147578 A1("the '578 publication"), the contents of which is incorporated herein by reference in its entirety. The method provides reformulating the query by eliminating one or more non-interesting terms using semantic and syntactic information for one or more of the terms; and querying a database of information based upon the reformulated query. Numerous interrelated dictionaries, thesauri and ontologies are used in the course of processing each question.

Hence, ontology in the system of the '578 publication is a part of system that reformulates a query by eliminating non-informative terms.

Ontology is also applied in information retrieval systems to rank query feedback terms, as is described in U.S. Pat. No. 6,363,378 B1("the '378 patent"), the contents of which is incorporated herein by reference in its entirety. The information retrieval system processes the queries, identifies topics related to the query as well as query feedback terms, and then links both the topics and feedback terms to nodes of the knowledge base with corresponding terminological concepts. At least one focal node is selected from the knowledge base based on the topics to determine a conceptual proximity between the focal node and the query feedback nodes. Hierarchical relations from ontology are used to calculate semantic proximity between focal categories and query feedback terms. The query feedback terms are ranked based on conceptual proximity to the focal node.

Thus, in the '378 patent's information retrieval system, ontology is used for topic identification in the knowledge base and in the query and then for calculating the semantic proximity between query feedback terms and the node chosen from the database on the basis of determined topic.

Therefore, the idea of using ontology to improve information retrieval system performance is not new and it is disclosed in different manners in various patents. For example, some of the different manners disclosed include searching in structured and unstructured databases, document theme or topic identification, normalization of semantic representation of the string, search and integration of different types of data, query expansion, etc. As far as ontology use in query expansion is concerned, ontology is applied, generally, to expand keyword-based and concept-based search and hierarchical relations from ontology, and may be preponderantly used in a certain knowledge domain.

SUMMARY OF THE INVENTION

An exemplary embodiment of the present invention may include a system, method and/or computer program product that may provide an ability to solve a problem such as, e.g., but not limited to, inventor problems and user problems, based on semantic methods for data/knowledge presentation and processing, implemented in a linguistic processing module. The basic components of this module may be, in an exemplary embodiment, a linguistic knowledge base (KB), an ontology KB, and/or an expert KB.

The linguistic KB, according to an exemplary embodiment of the present invention, may provide a linguistic analysis of a user's query and its formal semantic representation—verb-parameter-object (VPO), also called "a technical function," which may be a formal specification of the problem.

The ontology KB may contain knowledge of the surrounding world, presented in a number of terms (concepts and verbs) from different knowledge domains and semantic relations binding these terms, examples include: synonymic, "kind-of" and associative relations.

The linguistic processing module may perform semantic expansion with help of the ontology KB. The linguistic processing module may provide for a maximum recall and precision of information retrieval when searching for solutions to a given problem or its analogs, which may be very important when dealing with the mentioned class of tasks. In addition to this, a user may have the possibility of varying the degree of the semantic expansion based on proximity of terms in the ontology KB.

Expert KB, in an exemplary embodiment, may be a knowledge database of solutions for technical problems, obtained from numerous text documents, mainly from patents and articles. These solutions may be presented in SVPO format, where S may be a subject, or solver or performer of a technical function defined by VPO. Comparing a semantically expanded query and solutions from the expert KB, the linguistic processing module may locate the solutions (including analogous solutions) for the given query. The output of the linguistic processing module, in an exemplary embodiment, may be a semantically sorted list of these solutions. As a result, the user may be presented with a list of, e.g., precise, particular, general and analogous solutions for the query.

According to an exemplary embodiment of the present invention, the linguistic processing module may provide an effective solution for a user's query by implementing linguistic, ontology and expert knowledge bases (KBs) and a set of tools to edit and otherwise enrich them together with semantic methods (based thereupon) for information/knowledge processing.

Ontology use may significantly improve the performance of information retrieval systems, which deal with documents that are the main information-carrying medium:
- if the correct semantic analysis of user query is provided;
- if ontology is used for each of the main informative elements of user query; or/and
- if ontology reflects all the necessary knowledge domain concepts and relations needed to solve the above-mentioned tasks.

Therefore, exemplary distinctive characteristics of our approach may include the following:

1. A new method for solving problems such as, e.g, but not limited to, inventor problems and user problems, based on the linguistic processing of text documents (mainly for patents) may be provided;

2. By virtue of point 1, the linguistic processing module may provide:
   a) a formal representation of the problem in the in the format of Verb-Parameter Object (VPO);
   b) an automatic semantic expansion of the formal representation based on ontology;
   c) an automatic semantic indexing of patent collections;
   d) an automatic search of the exact solution in virtue of points (2)(a) and (2)(b); and/or e) an automatic search of the exact solution of more general, more specific and an analogical problem.

3. The developed ontology may be universal from the point as:
   a) the ontology can be applied in any knowledge domain;
   b) the ontology reflects semantic relations for the main semantic categories including concepts, their attributes and verbs;
   c) the ontology reflects main semantic relations between semantic categories including:
      main-attribute relations;
      synonymous relations;
      hierarchical relations; and
      associative relations;
   d) the ontology possesses the mechanism for regulating relation depth between semantic categories; and/or
   e) the ontology may be open for the user, i.e. the technology for its editing may be provided.

In this way, the approach of the exemplary embodiment of the present invention, may actually provide effective support of professional activities of inventors and may facilitate the solving of problems of a typical user.

Further features and advantages of the invention, as well as the structure and operation of various exemplary embodiments of the invention, are described in detail below with reference to the accompanying drawings.

BRIEF DESCRIPTION OF THE DRAWINGS

The foregoing and other features and advantages of the invention will be apparent from the following, more particular description of exemplary embodiments of the invention, as illustrated in the accompanying drawings. In the drawings, like reference numbers generally indicate identical, functionally similar, and/or structurally similar elements. The drawing in which an element first appears is indicated by the leftmost digits in the corresponding reference number. A preferred exemplary embodiment is discussed below in the detailed description of the following drawings.

DETAILED DESCRIPTION OF THE VARIOUS EXEMPLARY EMBODIMENTS

Overview of Linguistic Processing Module for Inventor and User Problems

An exemplary embodiment of the present invention may provide a way of solving problems. In an exemplary embodiment, a linguistic processing module (LPM), with help of a multi-component knowledge base (KB) for natural language and relations between entities of a certain area of interest, may provide high-quality understanding of structured and non-structured user queries and a search technique for finding a most exact and complete list of related solutions.

Figure 1:
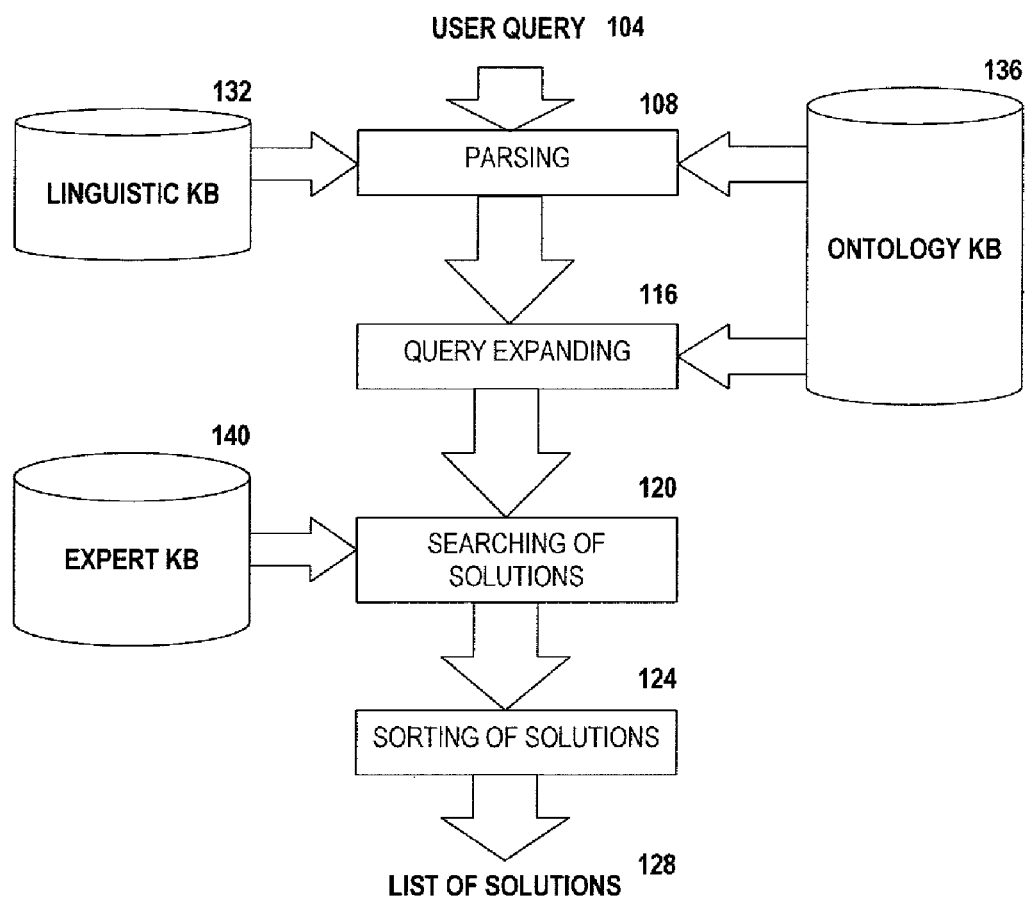
FIG. 1 provides a structural and functional scheme of linguistic processing module for inventor and user problems solving according to an exemplary embodiment of the present invention.

FIG. 1 depicts a diagram 100 illustrating a structural and functional scheme of a linguistic processing module (LPM) for inventor and user problem solving according to an exemplary embodiment of the present invention. The LPM of FIG. 1 may receive, as illustrated, a User Query 104. Using Linguistic Knowledge Base 132, the LPM may process User Query (Unit 108) and may produce its formal presentation (Unit 112, not shown). Further, a semantic expansion may be performed for the given query (Unit 116) with use of an Ontology Knowledge Base 136 of LPM. The multitude of search patterns obtained thereby may be fed to the Search Module 120 of LPM. Using an Expert Knowledge Base 140, LPM may locate all available solutions (which may be stored as a number of search patterns) for the problem, may sort them according to relevance (Unit 124) and may output the results for the user as a list of solutions (Unit 128).

The Linguistic KB 132 may contain, e.g., but not limited to, rules for parsing, a lemmatization dictionary, a linguistic algorithm for leftmost word trimming and for noun phrases canonization, in an exemplary embodiment.

The Ontology KB 136 may be a hierarchical database of terms for different knowledge domains. The "term" here is used to denote a concept (term-concept) and a verb (term-verb). Before the structure and contents of Ontology KB is described, it is necessary to give the following definitions:

Synonymy—the semantic relation that holds between two words or two grammatical structures that can (in a given context) express the same meaning.

For example: "alter", "change", "modify", "vary"

Direct synonyms—words or grammatical structures the have the same (or close) meaning regardless of the context.

For example: "water", "aqua"

Syntactic synonyms—grammatical structures of different types expressing the same (or close) meaning.

For example: "to heat", "to increase temperature"

"Kind-of" relation (hypernymy/hyponymy)—semantic relation that holds between two words or two grammatical structures where one of them represents a class of objects and the other is a particular representative of the given class.

For example: "oxygen"→"gas", "increase"→"change", "temperature"→"parameter"

Association—semantic relation between two words or two grammatical structures with meanings that are in coordinate relations to each other. They are called "sisters/brothers" and have the same "parent" hypernym and are referred as "children" of this hypernym.

Verb-Parameter-Object (VPO)—formal specification of the problem; Verb here denotes a technical function to be improved; Parameter (may be absent, in which case we refer to VO only) denotes a specific characteristic of the technical system or an element of a technical system to be improved; Object denotes a technical system or an element of a technical system involved into the technical function or process.

For example:

Problem: How to increase temperature of water?

VPO: V (increase) P (temperature) O (water)

Subject (S)—is a "solver" of a technical problem defined in VPO structure.

For example:

Fire increases temperature of water

S (fire) V (increase) P (temperature) O (water)

Main-word—a particular word within a noun-phrase, which defines grammatical properties of the entire noun-phrase.

For example:

Noun-phrase: cold water

Main-word: water

Lemmatization—the process of producing the initial form of a word from its word-forms. The initial form for verbs is infinitive form of the verb, for nouns—noun in Nominative case, singular number.

For example:

verb: "moving"→"(to) move"

noun: "cars"→"car"

Synset—a set of synonymic concepts (either nouns or verbs).

For example:

Synset: "marine vessel", "vessel", "watercraft"

Synonym expansion—a function that takes a word (or more complex grammatical element, such as VPO) and returns a set of grammatical elements which express the same meaning.

For example:

"vessel"—is expanded into—"marine vessel", "watercraft"

"(to) heat"—is expanded into—"increase temperature"

"Kind-of" expansion—a function that takes a word (or more complex grammatical element, such as VPO) and returns a set of grammatical elements which express more general or more specific meaning.

For example:

"marine vessel"—is expanded into—"craft" (general meaning)

"marine vessel"—is expanded into—"ice yacht", "patrol boat", "scooter", etc . . . (specific meanings)

"Association" expansion—a function that takes a word (or more complex grammatical element, such as VPO) and returns a set of grammatical elements which express closely associated meanings.

For example:

"regularization"—is associated with—"regulation", "quality control", "restraint", etc. . . . .

The terms in Ontology KB are grouped on the basis of the following relations:
1) "synonymy"—relation, including:
   1a) "direct synonym"—relation
   1b) "syntactic synonym"—relation
2) "Kind-of"—relation (hypernym→hyponym)
3) "association"—relation Besides, relations (1a), (2) and (3) are characteristic of term-concepts and (1a), (1b) and (2) are characteristic of term-verbs. Relation of type (1b) refers to synonyms in form of:

$verb_1 = verb_2 + parameter$, for example:
   moisten=augment humidity
   heat=increase temperature In order to enrich Ontology KB 136, a special computer-based toolset according to the present invention was developed which automated the work of domain knowledge experts (or lexicographers).

Figure 2:
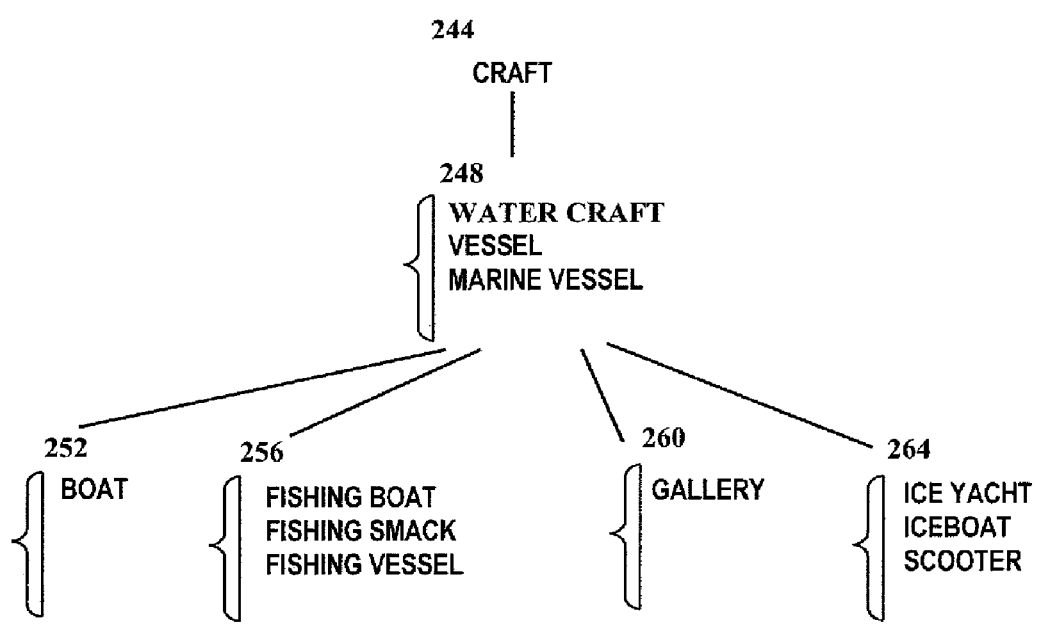
FIG. 2 provides an example fragment of Ontology KB for concepts according to an exemplary embodiment of the present invention.

FIG. 2 depicts a tree diagram 200, showing an example illustrating an excerpt from Ontology KB 136 of term-concepts. Every node of the tree 200 (except nodes 244, 252, 260) contain terms, connected via relation of type (1a), while the arcs of the tree denote relation of type (2). Thus, any term from node 248 is a hyponym for the term from node 244. Eventually, any term from any node may be connected via relation of type (3) with any other term from another node of the same level. For instance, the only term from node 252 is in relation (3) with either of the terms from nodes 256, 260, 264.

Expert KB 140 (FIG. 1) is a knowledge base of technical solutions extracted from Natural Language (NL) documents (patents, articles, etc.). The expert KB 140 may be used by the search module only. Each solution is presented by a NL sentence and by 4 pairs of fields, corresponding to the basic concepts of S, V, P, O (Subject, Verb, Parameter, Object; further, SVPO). It should be noted that Subject fields are not directly used by the search engine and are considered as a solution of the problem (defined by VPO fields).

A number of requirements must be met to correctly produce the VPO fields for the search:
1. Every field must be presented in a canonized form:
   Parameter and Object must contain noun phrases (or groups) in Nominative case, singular number, for example:
   "nanotube arrays"→"nanotube array"
   if Parameter and/or Object contain of-phrases, they must be converted into stone-wall constructions, for example:
   "query of user"→"user query"
   Verb fields must contain verb (and, optionally, a postposition) in its infinitive form, for example:
   "provided"→"provide"
2. Parameter or Object fields with two or more terms bound with help of a conjunction are split into several parts at the point(s) of conjunction(s), thus forming 2 or more Parameters or Objects, for example:
   "polymers and copolymers"→"polymer", "copolymer"
3. Parameter and/or Object fields contain simple noun phrases, all additional information is stripped:
   "bowl containing water"→Object: "bowl"

An example of a technical solution is shown below:

NL Format:
   Accelerometer detects acceleration of magnetic head

SVPO Format:
   S: accelerometer
   V: detect
   P: acceleration
   O: magnetic head The Linguistic Processing Module (FIG. 1) works using the described above knowledge bases (Linguistic KB 132, Ontology KB 136, Expert KB 140). User Query 104 may be provided to the LPM. Initially the work of LPM may be focused on the validation of the user's query. VPO fields are mandatory for the query structure. The idea is that, as the research showed, the majority of invention problems could be presented in form of a so-called "technical function", that is, in VPO form, which is a formal specification of a problem (for example: "disk increases the depth of grinding", where V is "increases", P is "depth", O is "grinding"), while the solution of the problem lies in locating the performer of this technical function. As the term suggests, structured (VPO) functional query is not to be linguistically processed. The non-structured functional query undergoes linguistic processing in order to obtain VPO fields. LPM uses a few rules for linguistic processing (Unit 108) which are used to describe a Top-Down Parsing model. The processing algorithm does not require a lot of resources to be implemented. It appears to be quite efficient for processing non-structured user's query, given the following restrictions:

absence of Subject, and more sophisticated sentence structure, than that which can be found in most written texts, since all input sentences are using Imperative Mood.

Below you can find examples of non-structured user queries and the results of their linguistic processing.

Example 1

Query: How to test fatigued metals?

Structured form: V (test) O (fatigued metal)

Example 2

Query: How to measure mechanical properties of MEMS material?

Structured form: V (measure) P (mechanical property) O (MEMS material)

It should be noted, that together with Linguistic KB (Unit 132) the LPM may use Ontology KB 136 during processing, which may provide terms for noun and verb phrases and, eventually, may increase the performance of processing. A parsed user's query may be a formalized VPO structure. These fields must meet the same canonization requirements as those, specified for Expert KB 140.

User Query 104 in VPO format may be further submitted to Query Expansion module (Unit 116), which may make use of the hierarchical structure of Ontology KB 136 to perform semantic term expansion. This procedure may be needed later, in order to retrieve as many problem-related solutions as possible, using Expert KB 140.

Figure 3:
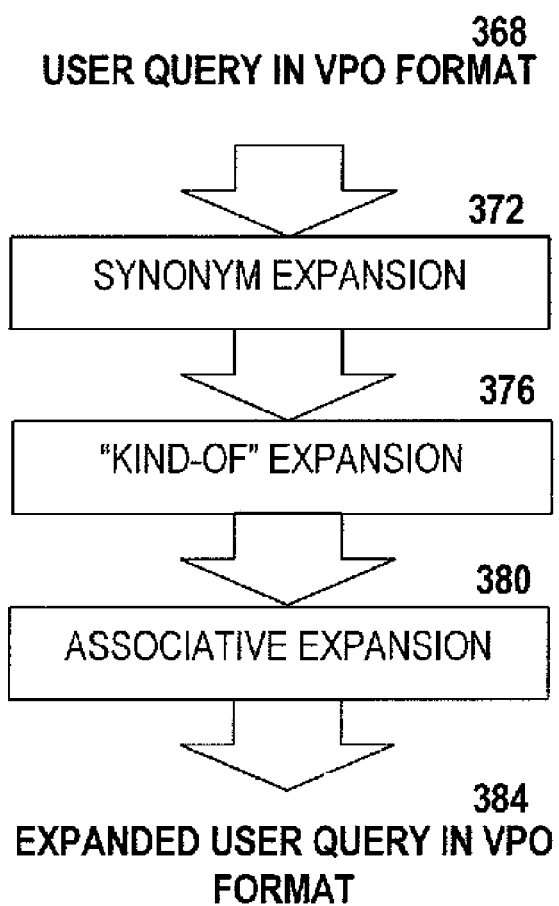
FIG. 3 provides a structural and functional scheme of an Expanding module of linguistic processing module (LPM) according to an exemplary embodiment of the present invention.

FIG. 3 depicts diagram 300 illustrating a structural and functional scheme of expanding module of LPM according to an exemplary embodiment of the present invention. Diagram 300 illustrates that a user query in VPO format 368 may be expanded using any of various exemplary expansions. Any of the following expansions may be implemented correspondingly (as illustrated in FIG. 3):

synonym expansion 372 (performed for verbs, parameters and objects);

"kind-of" expansion 376 (hypernymic-hyponymic expansion, performed only for objects); and/or associative expansion 380 (performed only for objects).

The synonym expansion (Unit 372) may be a case when each field of user query (in VPO format) may be substituted with its corresponding synonym: direct and syntactic synonyms.

For example:

Input (user's query): change dimensions of a solid body

VPO format: V (change) P (dimension) O (body)

Output (synonym expansion): V (change, alter, modify, vary)
P (dimension, proportion, size)
O (body, organic structure, physical structure)

It should be noted that in case of syntactical synonyms (V→VP or VP→V), the resulting terms may also be expanded to obtain synonymic terms.

"Kind-of" expansion (Unit 376) is a case when each field may be substituted with the terms being in hierarchic relations (hypernym vs. hyponym) to the items specified in the query. "Kind-of" expansion may depend on the term being specified in the query and on the semantic possibilities of Ontology KB 136 to expand this term. There may be two types of "kind-of" expansions:

from a particular term to a general one (bottom-to-top);

for example:

Input (user's query): change the surface curvature of the conducting liquid drop VPO format: V (change) P (surface curvature) O (conducting liquid drop)

Output (hypernymic V (change)
expansion, performed only for
Object):
P (surface curvature)
O (round shape, small indefinite amount)

and, from a general term to a particular one (top-to-bottom);

for example:

Input (user's query): change the direction of movement of the gas flow

VPO format: V (change) P (direction) O (movement)
Output (hyponymic expansion, V (change)
performed only for Object):
P (direction)
O (abduction, adduction, flit, dart, circumduction, inclination, retraction, retrofection, rotation, vibration . . . ).

"Kind-of" relation 376 may give the possibility to examine more particular, more general and associated solutions.

Associative expansion (Unit 380) may be a case when each field may be substituted with the terms in associative relations to the items specified in the query.

For example:

Input (user's query): measure traveling distance

VPO format: V (measure) O (traveling distance)

Output (associative expansion, V (measure)
performed only for Object):
P(−)
O(light time, skip distance, wingspan, wingspread, object distance, migration distance, migration length, altitude . . . )

Expansion of the associative kind 380 may allow one to examine the solutions for similar problems (analogous solutions). Thus an expanded user query in VPO format 384 may result as shown.

The goal of Searching for Solutions module (Unit 120) is to look for the solutions in Expert KB (Unit 140) according to the obtained expansion from Query Expanding module (Unit 116) and consequently, present a list of solutions 128. The search engine may compare the VPO fields from Expert KB 140 with the obtained expansions 372, 376, 384 from Query Expanding module 116, 300. The correspondence of these fields may result in retrieval of pertinent solutions according to the user's query 104.

The solutions in Expert KB 140 which may coincide with expansions in terms of concepts and verbs to a certain degree, may be extracted and may be put into the list of solutions 128 to be presented as a result to the user. Due to the nature of those solutions they may need to be semantically sorted (in accordance with the types of expansions 372, 376, 380). Sorting of Solutions module (Unit 124) may sort all records from Expert KB 140 that were marked for output in the following order:

1. Precise solutions. These are the solutions in which VO or VPO fields may exactly coincide with those initially formulated in the query.

For example:

| User's query: | | V (heat) | | O (water) |
|---|---|---|---|---|
| Solution: | S (coil) | V (increase) | P (temperature) | O (water) |

2. Particular solutions. These are the solutions where at least one field out of VO or VPO fields may present more specific terms than those formed in the query.
For example:

| User's query: | | V (neutralize) | O (acid) |
|---|---|---|---|
| Solution: | S (alkali) | V (neutralize) | O (hydrochloric acid) |

3. General solutions. These are the solutions in which at least one of the fields from VO or VPO may be a generalization of the term formulated in the query.
For example:

| User's query: | | V (neutralize) | O (hydrochloric acid) |
|---|---|---|---|
| Solution: | S (alkali) | V (neutralize) | O (acid) |

4. Analogous solutions. These are the solutions where at least one of the fields from VO or VPO may represent an associated term with those formulated in the query.
For example:

| User's query: | | V (neutralize) | O (hydrochloric acid) |
|---|---|---|---|
| Solution: | S (alkali) | V (neutralize) | O (nitric acid) |

In the examples above S stands for "a subject" or a Solver of the problem. The algorithm for sorting the solutions according to their type can be presented in the following two tables (for VPO and VO formats, respectively). A number of symbols used in the table should be described beforehand:

S—original term or its synonym, H—hyponyms, R—hypernyms, C—associated terms, Exact—exact matching of terms, Partial—partial matching (according to Leftmost Word Trimming algorithm), Any—Exact or Partial match.

TABLE 1

| Solution type | Verb (V) | Parameter (P) | Object (O) | Extra condition |
|---|---|---|---|---|
| Precise | S-Exact | S-Exact | S-Exact | |
| Particular | S-Exact | S-Exact | SH-Exact | O ∈ H-Exact |
| General (1) | S-Exact | S-Exact | SHR-Exact | O ∈ R-Exact |
| General (2) | S-Exact | S-Any | SHR-Any | P ∈ S-Any & O ∈ SHR-Partial |
| Analogous | S-Exact | S-Any | SHRC-Any | O ∈ C-Any |

TABLE 2

| Solution type | Verb (V) | Parameter (P) | Object (O) | Extra condition |
|---|---|---|---|---|
| Precise | S-Exact | — | S-Exact | |
| Particular | S-Exact | — | SH-Exact | O ∈ H-Exact |
| General (1) | S-Exact | — | SHR-Exact | O ∈ R-Exact |
| General (2) | S-Exact | — | SHR-Any | O ∈ SHR-Partial |
| Analogous | S-Exact | — | SHRC-Any | O ∈ C-Any |

It is deemed necessary to comment on these tables. Let us take, for example, row "Analogous" from Table 1: column "Verb" says "S-Exact", which means that the Verb field can contain a synonym (S) for the incoming (non-trimmed (Exact)) Verb. The same is relevant to Parameter field, except that the synonyms can be found for a trimmed or non-trimmed Parameter. Also, the Object field may contain any term obtained via semantic expansion (SHRC-Any). Eventually, "Extra condition" column says, that Object (trimmed or not, that is, "Any") must contain an associated term (C).

As it is seen, there are two (2) "General" rows in the table. General (1) refers to those solutions, obtained only from semantic expansions of non-trimmed original term. General (2) refers to those solutions, obtained with use of Leftmost Word Trimming algorithm.

The idea of Leftmost Word Trimming algorithm is as follows. In case the exact match for the incoming term is not found in Ontology KB, the leftmost word is deleted and the remaining part of the term is again sought for in the Ontology KB. This process is repeated until the match is found or there is only one word from the original term remains. In either case, the trimmed versions of the original term are referred to as having more general meaning, as compared to the complete, non-trimmed original term. For example: "photosensitive resin composition"—is trimmed to—"resin composition"—is trimmed to—"composition".

A computer and/or communications system may be used for several components of the system in an exemplary embodiment of the present invention. An exemplary embodiment may include a computer as may be used for several computing devices such as, e.g., but not limited to, the knowledge bases of the exemplary embodiments of the present invention. The computer may include, but is not limited to: e.g., any computer device, or communications device including, e.g., a personal computer (PC), a workstation, a mobile device, a phone, a handheld PC, a personal digital assistant (PDA), a thin client, a fat client, a network appliance, an Internet browser, a paging, or alert device, a television, an interactive television, a receiver, a tuner, a high definition (HD) television, an HD receiver, a video-on-demand (VOD) system, a server, or other device.

The computer, in an exemplary embodiment, may include a central processing unit (CPU) or processor, which may be coupled to a bus. Processor may, e.g., access main memory via bus. The computer may be coupled to an Input/Output (I/O) subsystem such as, e.g., a network interface card (NIC), or a modem for access to a network. Computer may also be coupled to a secondary memory directly via bus, or via main memory, for example. Secondary memory may include, e.g., a disk storage unit or other storage medium. Exemplary disk storage units may include, but are not limited to, a magnetic storage device such as, e.g., a hard disk, an optical storage device such as, e.g., a write once read many (WORM) drive, or a compact disc (CD), or a magneto optical device. Another type of secondary memory may include a removable disk storage device, which may be used in conjunction with a removable storage medium, such as, e.g. a CD-ROM, or a floppy diskette. In general, the disk storage unit may store an application program for operating the computer system referred to commonly as an operating system. The disk storage unit may also store documents of a database (not shown). The computer may interact with the I/O subsystems and disk storage unit via bus. The bus may also be coupled to a display for output, and input devices such as, but not limited to, a keyboard and a mouse or other pointing/selection device.

In this document, the terms "computer program medium" and "computer readable medium" may be used to generally refer to media such as, e.g., but not limited to removable storage drive, a hard disk installed in hard disk drive, and signals, etc. These computer program products may provide software to computer system. The invention may be directed to such computer program products.

References to "one embodiment," "an embodiment," "example embodiment," "exemplary embodiments," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. While this invention has been particularly described and illustrated with reference to a preferred embodiment, it will be understood to those having ordinary skill in the art that changes in the above description or illustrations may be made with respect to formal detail without departing from the spirit and scope of the invention.

What is claimed is:

1. A method for solving a problem comprising:
   receiving a user query problem description which comprises at least one of a structured user query problem description or a non-structured user query problem description, said structured user query problem description comprising a formal semantic representation of said user query problem description, said formal semantic representation comprising fields;
   parsing said user query problem description when said user query problem description is a said non-structured user query problem description, to create said structured user query problem description;
   semantically expanding said formal semantic representation of said user query problem description based on an ontology knowledge base to obtain a semantic expansion of said formal semantic representation of said user query problem description, wherein said ontology knowledge base comprises a database of a plurality of terms, each of said plurality of terms being classified as at least one of a term-concept or a term-verb, wherein two or more of said plurality of terms are related with one another representing a knowledge domain, said semantic expansion having a type comprising a kind-of expansion and at least one of a synonym expansion or an association expansion on at least one term in said formal semantic representation of said user query problem description, wherein said kind-of expansion comprises a hypernym to hyponym expansion;
   searching an expert knowledge base using said semantic expansion to obtain a solutions list including at least one solution for said user query problem description, each said solution comprising fields, said at least one solution having a semantic relation to said user query problem description determined based on said type of semantic expansion;
   semantically sorting said solutions list based on said semantic relation of said at least one solution to said user query problem description;
      wherein said semantically sorting comprises sorting said solutions list based on solution types, wherein said solution types comprise:
      a precise solution comprising said fields exactly coinciding with or a synonym of said fields of said structured user query problem description;
      a particular solution comprising at least one said field more specific than a corresponding field of said structured user query problem description;
      a general solution comprising at least one said field generalizing the corresponding field of said structured user query problem description; and
      an analogous solution comprising at least one said field associated with the corresponding field of said structured user query problem description; and
   storing said solutions list in a computer-readable storage medium.

2. The method of claim 1, wherein said user query problem description comprises a structured query comprising a verb parameter object (VPO) format.

3. The method of claim 1, wherein a problem of said user query problem description comprises at least one of an inventor problem or a user problem.

4. The method of claim 1, wherein said non-structured user query problem description is presented in a natural language format.

5. The method according to claim 3, wherein said searching obtains said solutions list based on a relevance of said at least one solution to the problem.

6. The method of claim 1, wherein said parsing step comprises:
lexically and grammatically analyzing said non-structured user query problem description to obtain a lexical or grammatical analysis of said non-structured user query problem description; and
semantically analyzing said non-structured query based on said lexical or grammatical analysis of said non-structured user query problem description to create said formal semantic representation of said user query problem description.

7. The method of claim 6, wherein said lexically and grammatically analyzing is based on at least one of a linguistic knowledge base, or the ontology knowledge base to recognize noun and verb phrases of said user query problem description.

8. The method of claim 6, wherein said semantically analyzing creates said formal semantic representation of said user query problem description in a verb parameter object (VPO) format using a lemmatization dictionary and linguistic algorithms for noun and verb phrases canonization and list of parameters from a linguistic knowledge base.

9. The method of claim 1, wherein a relation of two or more of said plurality of terms classified as a term-verb includes at least one of a direct synonym or a syntactic synonym.

10. The method of claim 1, wherein a relation of two or more of said plurality of terms classified as a term-concept includes at least one of a direct synonym, a kind-of or an association.

11. The method of claim 1, wherein said ontology knowledge base comprises at least one of technology or tools for domain knowledge experts to edit or enrich said ontology knowledge base.

12. The method of claim 1, wherein said semantic expansion comprises a list of search patterns relevant to said formal semantic representation of said user query problem description.

13. The method of claim 12, wherein at least one search pattern from said list of patterns includes a relevance value representing a degree of relevance of said search pattern to said formal semantic representation of said user query problem description.

14. The method of claim 13, wherein said searching comprises locating all available solutions of the problem in said expert knowledge base based on at least one search pattern to obtain said solutions list.

15. The method of claim 14, wherein said expert knowledge base is a knowledge base of technical solutions extracted from a natural language document.

16. The method of claim 15, wherein said natural language document comprises at least one of a patent or an article.

17. The method of claim 15, wherein said technical solutions are presented in natural language sentences or in subject verb parameter object (SVPO) format.

18. The method of claim 14, wherein said expert knowledge base is provided with technology or tools for domain knowledge experts to edit and enrich said expert knowledge base.

19. The method of claim 15, wherein said locating all available solutions is performed for the technical solutions from said expert knowledge base, where V, P or O fields match the appropriate fields of the search patterns.

20. The method of claim 19, wherein said technical solutions located are given similar relevance values to relevance values of the search patterns.

21. The method of claim 1, wherein the ontology knowledge base is based on an ontology comprising a hierarchical lexical structure.

22. The method of claim 15, wherein said solutions list is further sorted according to the relevance values of said technical solutions.

23. A system for solving a problem comprising:
receiving means for receiving a user query problem description which comprises at least one of a structured user query problem description or a non-structured user query problem description, said structured user query problem description comprising a formal semantic representation, said formal semantic representation comprising fields;
parsing means for parsing said user query problem description when said user query problem description is a said non-structured user query problem description, to create said structured user query problem description;
semantically expanding means for semantically expanding said formal semantic representation of said user query problem description based on an ontology knowledge base to obtain a semantic expansion of said formal semantic representation of said user query problem description, wherein said ontology knowledge base comprises a database of a plurality of terms, each of said plurality of terms being classified as at least one of a term-concept or a term-verb, wherein two or more of said plurality of terms are related with one another representing a knowledge domain, said semantic expansion having a type comprising a kind-of expansion and at least one of a synonym expansion or an association expansion on at least one term in said formal semantic representation of said user query problem description, wherein said kind-of expansion comprises a hypernym to hyponym expansion;
searching means for searching an expert knowledge base using said semantic expansion to obtain a solutions list including at least one solution for said user query problem description, each said solution comprising fields, said at least one solution having a semantic relation to said user query problem description determined based on said type of semantic expansion;
semantically sorting means for semantically sorting said solutions list based on said semantic relation of said at least one solution to said user query problem description;
wherein said semantically sorting means comprises sorting means for sorting said solutions list based on solution types, wherein said solution types comprise:
a precise solution corn said fields exactly coinciding with or a synonym of said fields of said structured user query problem description;
a particular solution comprising at least one said field more specific than a corresponding field of said structured user query problem description;
a general solution comprising at least one said field generalizing the corresponding field of said structured user query problem description; and
an analogous solution comprising at least one said field associated with the corresponding field of said structured user query problem description; and
storing means for storing said solutions list in a computer-readable storage medium.

24. The system of claim 23, wherein the problem comprises at least one of an inventor problem or a user problem.

25. The system of claim 23, wherein said semantically expanding means comprises means for searching for any of said at least one solution that is relevant to the problem.

26. The system of claim 23, wherein said parsing means comprises:
    means for lexically and grammatically analyzing said non-structured user query problem description to obtain a lexical or grammatical analysis of said non-structured user query problem description; and
    means for semantically analyzing said non-structured query based on said lexical or grammatical analysis of said non-structured user query problem description to create said formal semantic representation of said user query problem description.

27. The system of claim 23, wherein said searching means locates at least one of available solutions of the problem in said expert knowledge base based on at least one search pattern to obtain said solutions list.

28. The system of claim 27, wherein said expert knowledge base comprises a knowledge base of technical solutions extracted from a natural language document.

29. The system of claim 28, wherein said solutions list is further sorted according to relevance values of said technical solutions.

30. A tangible machine readable storage medium that provides instructions, which when executed by a computing platform, cause said computing platform to perform operations comprising a method for solving a problem comprising:
    storing a user query problem description which comprises at least one of a structured user query problem description or a non-structured user query problem description, said structured user query problem description comprising a formal semantic representation said formal semantic representation comprising fields;
    parsing said user query problem description when said user query problem description is a said non-structured user query problem description, to create said structured user query problem description;
    semantically expanding said formal semantic representation of said user query problem description based on an ontology knowledge base to obtain a semantic expansion of said formal semantic representation of said user query problem description, wherein said ontology knowledge base comprises a database of a plurality of terms, each of said plurality of terms being classified as at least one of a term-concept or a term-verb, wherein two or more of said plurality of terms are related with one another representing a knowledge domain, said semantic expansion having a type comprising a kind-of expansion and at least one of a synonym expansion or an association expansion on at least one term in said formal semantic representation of said user query problem description, wherein said kind-of expansion comprises a hypernym to hyponym expansion;
    searching an expert knowledge base using said semantic expansion to obtain a solutions list including at least one solution for said user query problem description, each said solution comprising fields, said at least one solution having a semantic relation to said user query problem description determined based on said type of semantic expansion;
    semantically sorting said solutions list based on said semantic relation of said at least one solution to said user query problem description;
        wherein said semantically sorting comprises sorting said solutions list based on solution types, wherein said solution types comprise:
            a precise solution comprising said fields exactly coinciding with or a synonym of said fields of said structured user query problem description;
            a particular solution comprising at least one said field more specific than a corresponding field of said structured user query problem description;
            a general solution comprising at least one said field generalizing the corresponding field of said structured user query problem description; and
            an analogous solution comprising at least one said field associated with the corresponding field of said structured user query problem description; and
    storing said solutions list on a computer.

31. A method for solving a problem comprising:
    receiving a user query problem description on a computer, said user query problem description comprising at least one of a structured user query problem description or a non-structured user query problem description, said structured user query problem description comprising a formal semantic representation comprising a verb field, a parameter field and an object field;
    parsing said user query problem description when said user query problem description is a said non-structured user query problem description, to create said structured user query problem description;
    semantically expanding said formal semantic representation of said user query problem description based on an ontology knowledge base to obtain a semantic expansion of said formal semantic representation of said user query problem description, wherein said ontology knowledge base comprises a database of a plurality of terms, each of said plurality of terms being classified as at least one of a term-concept or a term-verb, wherein two or more of said plurality of terms are related with one another representing a knowledge domain, said semantic expansion having a type comprising a kind-of expansion and at least one of a synonym expansion or an association expansion on at least one term in said formal semantic representation of said user query problem description, wherein said kind-of expansion comprises a hypernym to hyponym expansion;
    searching an expert knowledge base using said semantic expansion to obtain a solutions list including at least one solution for said user query problem description, each said solution comprising a verb field, a parameter field and an object field, said at least one solution having a semantic relation to said user query problem description determined based on said type of semantic expansion;
    sorting said solutions list based on solution types, wherein said solution types comprise:
        a precise solution comprising said fields exactly coinciding with or a synonym of said fields of said structured user query problem description;
        a particular solution comprising at least one said field more specific than a corresponding field of said structured user query problem description;
        a general solution comprising at least one said field generalizing the corresponding field of said structured user query problem description; and
        an analogous solution comprising at least one said field associated with the corresponding field of said structured user query problem description;
    storing said solutions list on a computer; and
    providing said solutions list via the computer.

* * * * *